United States Patent [19] [11] 4,094,424
Harvey et al. [45] June 13, 1978

[54] REFUSE CONTAINER DISCHARGE STATION

[75] Inventors: Samuel E. Harvey, Knoxville; James Stephen Whitehead, Maryville; Paul L. Goranson, Knoxville, all of Tenn.

[73] Assignee: Carrier Corporation, Syracuse, N.Y.

[21] Appl. No.: 641,524

[22] Filed: Dec. 17, 1975

[51] Int. Cl.² ............................................. B65G 69/22
[52] U.S. Cl. ................................. 214/304; 100/229 A; 214/38 D; 214/41 A; 214/310
[58] Field of Search ................... 214/41 A, 44 R, 82, 214/304, 310, 301, 302, 38 BB, 38 D; 100/229 A; 267/75

[56] References Cited

U.S. PATENT DOCUMENTS

| 947,607 | 1/1910 | Arter | 104/50 |
|---|---|---|---|
| 1,366,292 | 1/1921 | Smith | 104/50 |
| 1,946,902 | 2/1934 | Ferris | 267/75 X |
| 2,355,675 | 8/1944 | Pryor et al. | 100/219 |
| 3,229,618 | 1/1966 | O'Connor | 100/219 |
| 3,446,315 | 5/1969 | Close | 214/44 X |
| 3,799,374 | 3/1974 | Weaver | 214/82 |
| 3,901,394 | 8/1975 | Bowles | 214/82 |

FOREIGN PATENT DOCUMENTS 2,220,450   4/1974   France ................... 214/301

Primary Examiner—Drayton E. Hoffman
Assistant Examiner—Carl Rowold
Attorney, Agent, or Firm—Burns, Doane, Swecker & Mathis

[57] ABSTRACT

An automated refuse container discharge station is disclosed in which a refuse container is emptied such that its volume decreases as an essentially constant function of time. The unloading station includes a support assembly on which a carriage assembly is adapted for longitudinally sliding motion. The carriage assembly includes container opening apparatus at one end and container discharging apparatus at the other end. The carriage assembly also includes apparatus for unlatching a container tailgate portion and releasably securing the container to the carriage. A hydraulic cylinder advances the carriage assembly with respect to the support assembly and hydraulically damps movement of the carriage and container at the end of the advancing stroke. The carriage assembly includes an hydraulic discharge cylinder which may be intermittently advanced into the container. Part of the discharge cylinder is supported by guides carried by the carriage and aligned guides carried by the container.

10 Claims, 13 Drawing Figures

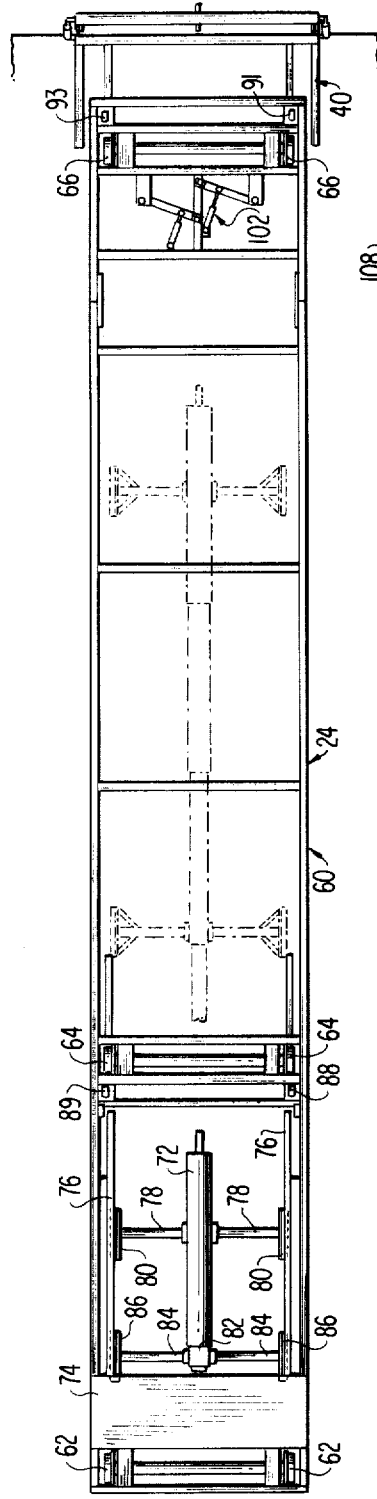
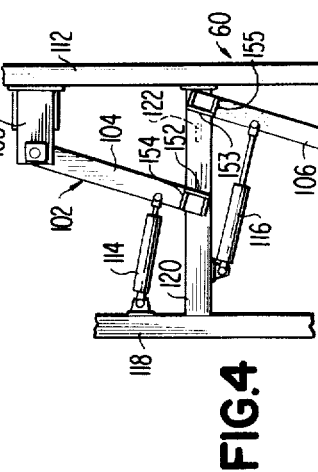
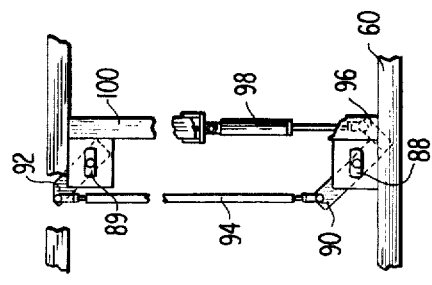
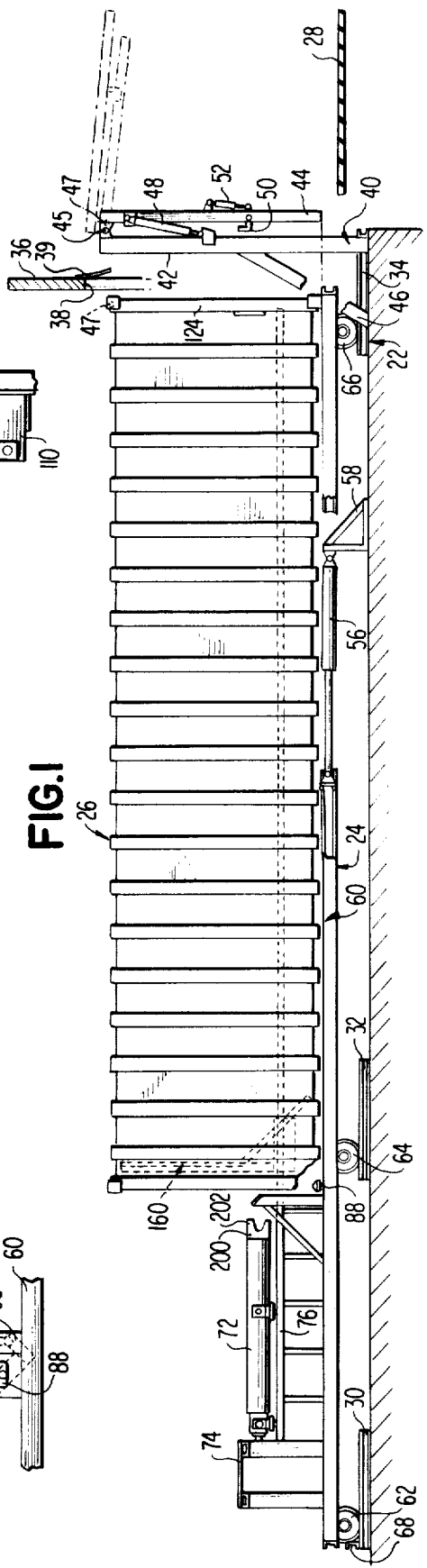

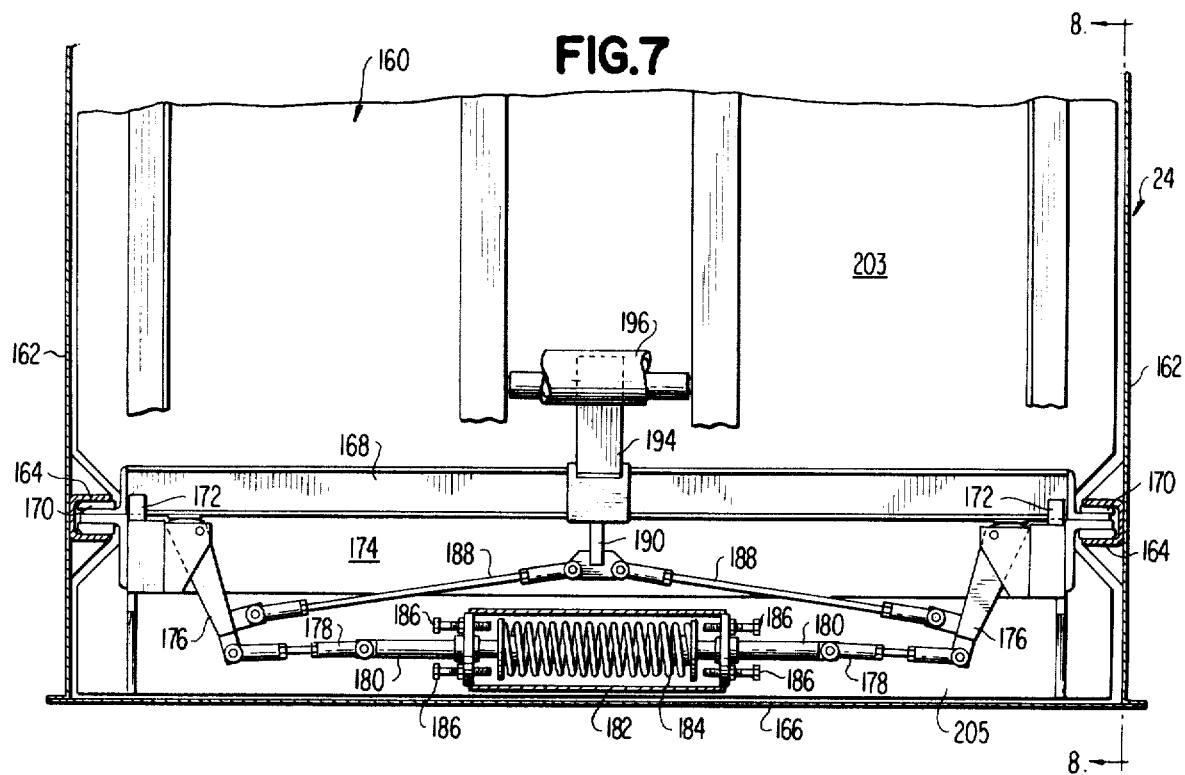
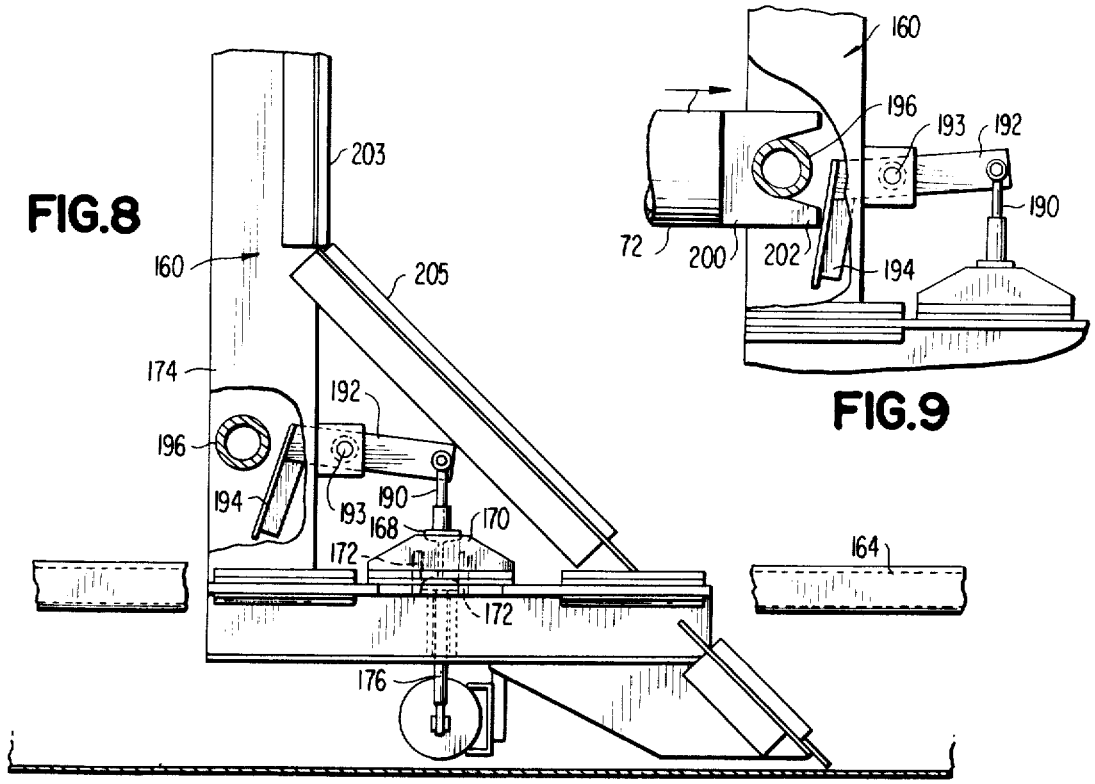

4,094,424

REFUSE CONTAINER DISCHARGE STATION

CROSS-REFERENCES TO RELATED APPLICATIONS

This application is related to the following copending and commonly assigned applications:

"Method and Apparatus for Transferring Refuse" by Harvey W. Lieberman and John C. Salyers, Ser. No. 641,757, filed Dec. 17, 1975 now U.S. Pat. No. 4,044,905; "Method and Apparatus for Loading Refuse Into Containers" by Harvey W. Lieberman, Paul L. Goranson, R. Houston Ratledge, Jr. and John C. Salyers, Ser. No. 641,325, filed Dec. 17, 1975; "Refuse Container" by Donald J. Hopkins, John C. Salyers and Paul L. Goranson, Ser. No. 641,371 filed Dec. 17, 1975 now U.S. Pat. No. 4,044,914; and "Methods and Apparatus for Controlling an Hydraulic Cylinder", by Harvey W. Lieberman and J. Stephen Whitehead, Ser. No. 641,370, filed Dec. 17, 1977. Each of the above-identified applications is expressly incorporated herein by this reference thereto.

BACKGROUND OF THE INVENTION

This invention relates generally to apparatus for discharging the contents of transportable refuse containers. More particularly, this invention concerns apparatus for discharging the contents from a refuse container with a slidable bulkhead at a rate which is essentially constant.

The use of transportable metallic containers for handling solid waste refuse material has long been known. Typical refuse containers are positioned at a collection point and loaded with solid refuse and transported to a sanitary land fill, for example. During discharge the containers are typically elevated at one end so that refuse material is allowed to discharge under the influence of gravity.

The use of gravity as a discharge force often results in a generally uncontrolled and precipitous discharge of refuse from a container. Where the refuse material is to be used, for example, as a fuel in a power generating facility, such uncontrolled and precipitous discharge of material is unacceptable.

Apparatus is also known in which containers are transported and adapted for discharge while lying substantially horizontal. See, for example, U.S. Pat. No. 3,720,328 issued to MacKenzie on Mar. 13, 1973. Known apparatus, however, is not suitable for use in a refuse burning installation as it is not amenable to automation. Moreover, large bulky containers are unwieldly to move and truly suitable apparatus must be able to position a large container accurately for unloading.

The use of an automatically actuated container discharge mechanism avoids the need for numerous workmen standing by to perform otherwise necessary operations such as unlatching and opening the container prior to the discharge thereof. Among other disadvantages of the known apparatus are the absence of vertical supports for longitudinally extending hydraulic cylinders, a transverse reciprocable bulkhead in the container and the presence of top openings in the container that require unduly heavy construction for the container.

Accordingly, it is seen that a need continues to exist for a refuse container unloading system which overcomes problems of the type noted above and which is adapted for essentially automatic operation with minimal need for workmen during the operation thereof.

OBJECTS AND SUMMARY OF THE INVENTION

One object of the present invention is to provide a novel refuse container unloading apparatus which discharges solid waste material from a refuse container at an essentially constant rate.

Another object of the present invention is to provide refuse container unloading apparatus which has an automatically operated refuse container door opening assembly.

A further object of the present invention is to provide refuse container unloading apparatus provided with an automatic container door unlatching assembly.

Yet another object of the present invention is to provide refuse container unloading apparatus having means for releasing a frictional resistance to longitudinal movement of a container bulkhead.

A yet further object of the present invention is to provide a method of unloading containers.

An unloading station that accomplishes the objects set forth above, as well as many others, includes a support assembly on which a carriage assembly is adapted for longitudinal movement. The carriage assembly is positioned relative to the support assembly by a suitable hydraulic mechanism which hydraulically dampens the end portion of a power stroke to reduce impact forces on the carriage assembly, the support assembly and adjacent structures.

To position and retain a refuse container on the carriage assembly, suitable retaining devices may be provided which are hydraulically operated to and from a container securing position.

The carriage assembly may also be provided with a hydraulically operated container latching and unlatching assembly which engages a latch actuator of the refuse container to release the container door for opening movement.

An end of the carriage assembly is preferably provided with a refuse container door opening assembly which may include a pivotally connected portion swingable about a generally horizontal axis and adapted to engage a tailgate portion of the container. The swingable portion may be hydraulically actuated to open the container tailgate assembly.

In order to move the refuse out of the container, the carriage assembly may have a telescopic hydraulic cylinder which is supported at one end by longitudinally extending guides. The refuse container may be provided with correspondingly positioned and configured guides. In this manner the end of the telescopic cylinder is guided longitudinally by the aligned guides of the carriage assembly and the guides of the container.

As the hydraulic cylinder extends into the container it engages a transverse slidably mounted bulkhead assembly and automatically releases a resistance assembly. Further extension of the hydraulic cylinder moves the bulkhead towards the tailgate assembly of the refuse container and discharges the solid refuse material positioned in front of the bulkhead. As the telescoping hydraulic cylinder retracts, the transverse bulkhead remains at the tailgate end of the refuse container and the resistance means is automatically engaged.

The container opening apparatus may cooperate with a building such that the carriage assembly and the refuse container carried thereby are partially advanced into an opening in a wall. Accordingly, refuse in the container may be discharged directly onto a feed conveyor in the building for subsequent processing.

BRIEF DESCRIPTION OF THE DRAWINGS

A preferred embodiment of the present invention is illustrated in the accompanying drawings wherein:

FIG. 1 is an elevation view of a container unloading apparatus with portions broken away to show partially hidden features;

FIG. 2 is a plan view of the apparatus of FIG. 1 with the container and positioning cylinder removed in the interest of clarity;

FIG. 3 is a detail view of refuse container securing apparatus;

FIG. 4 is a detail view of refuse container tailgate latching and unlatching apparatus in FIG. 2;

FIG. 7 is a view in partial cross section of the refuse container illustrating the bulkhead apparatus and resistance apparatus therefor;

FIG. 8 is an end view of the bulkhead apparatus taken along the line 8—8 of FIG. 7;

FIG. 9 is a view illustrating the cooperation between the ejection cylinder of the unloading apparatus and the resistance releasing apparatus;

DESCRIPTION OF THE PREFERRED EMBODIMENT

Figure 5:
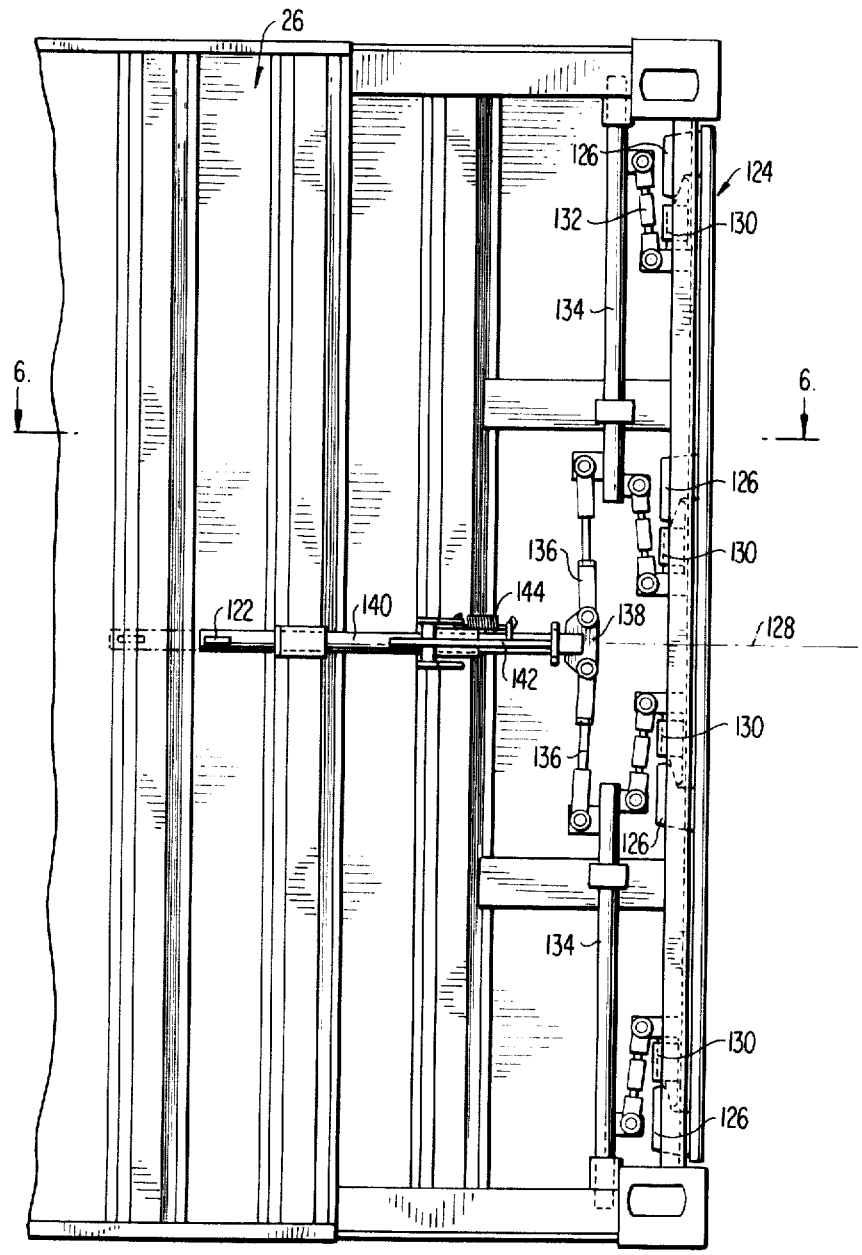
FIG. 5 is a bottom view of the tailgate end portion of a refuse container adapted for use with the unloading apparatus of the present invention.

Turning now to FIG. 1, an unloading station 20 includes a support assembly 22 on which a carriage assembly 24 is mounted for longitudinal sliding movement. The carriage assembly 24 is adapted to receive and releasably hold a large metal refuse container 26 having a capacity on the order of one hundred cubic yards and previously loaded with refuse material for discharge onto a conveyor 28 that transports the refuse for subsequent processing. One particular use that is suitable for refuse is to burn the refuse as a fuel in an energy generating facility.

The support assembly 22 includes one or more pairs of laterally spaced tracks 30, 32, 34 which permit the carriage assembly 24 to move from a container receiving position depicted in FIG. 1 to a container discharging position depicted schematically in FIG. 1. The track sections 30, 32, 34 may be, for example, approximately 3 feet long and may, if desired, comprise a single pair of laterally spaced apart continuous longitudinal tracks.

At one end of the support assembly 22 is a wall 36 of a building having an opening 38 therethrough. The opening 38 is sized to permit the carriage assembly 24 and an end portion of the container 26 to pass therethrough into the building. When, for example, the building is a power plant that typically operates with a subatmospheric internal pressure, the opening 38 may be provided with a peripherally disposed seal means 39 which cooperates with the exterior of the container 26 to effect a seal therewith.

Positioned inside the building and adjacent the opening 38 is a container tailgate opening apparatus 40 which includes a generally vertical upright rigid portion 42 to which a swingable portion 44 is mounted for rotatable movement about a generally horizontal axis 45 positioned adjacent to the top of the rigid frame 42. The rigid frame 42 may be suitably braced by triangularly positioned brace members 46 and defines an opening through which the carriage assembly 24 and the refuse container 26 may be advanced.

The swingable portion 44 of the tailgate opening assembly 40 is a generally U-shaped member, disposed with the upstanding portions to the rigid portion 42 along the axis 45. Each upstanding portion of the swingable frame 44 is pivotally connected to a corresponding hydraulic door lift cylinder 48 such that one cylinder is disposed on each side of the rigid frame portion 42. Preferably, the second end of each hydraulic cylinder 48 is pivotally connected to the rigid portion 42 such that actuation of the hydraulic door lift cylinders 48 causes movement of the swingable frame portion 44 with respect to the rigid frame portion 42.

The horizontal portion of the U-shaped swinging frame portion 44 is provided with a centrally disposed hook-shaped member 50. The hook-shaped member 50 is pivotally mounted on the swingable frame 44 and is articulated by an hydraulic door engagement cylinder 52. Extension or contraction of the door engagement cylinder 52 causes the hook member 50 to move in a generally vertical arcuate path such that it can engage a horizontal bar (not shown) of the tailgate portion of the refuse container 26.

The carriage assembly 24 is longitudinally reciprocated between the container receiving position and the container discharge position by an hydraulic positioning cylinder 56. One end of the positioning cylinder 56 is pivotally connected to an abutment 58 of the support assembly 22; the second end of the positioning cylinder 56 is pivotally connected to the carriage assembly 24. Accordingly, retraction of the positioning cylinder 56 advances the carriage assembly 24 toward the container unloading position, whereas, extension of the positioning cylinder 56 moves the carriage assembly 24 toward the container receiving position.

With continued reference to FIG. 1, the carriage assembly 24 includes a generally horizontal frame portion 60 which is supported with respect to the tracks 30, 32, 34 by corresponding sets of wheels 62, 64, 66. The wheels may be flanged to prevent their lateral displacement from the corresponding tracks. Moreover, the first track sections 30 may be provided with a transversely extending member 66 to prevent the carriage assembly 24 from rolling off the tracks at the container loading position.

The track sections 34 may be similarly provided with a suitable cross member to prevent the flanged wheels 66 from rolling off the tracks at the container unloading position. The cross member at the container unloading position may comprise an abutment to restrain further movement of the carriage assembly 24 and the refuse container 26.

Disposed at an end of the carriage assembly 24 remote from the building wall 36 is a suitable conventional telescoping hydraulic cylinder 72. The hydraulic ejection cylinder 72 is supported at one end by an upstanding structural portion 74 of the carriage assembly 24 which is rigidly secured to the frame portion 60.

The carriage assembly 24 also includes a pair of laterally spaced apart guides 76 which are supported vertically above the frame portion 60 and serve as longitudinal guides for supports carried by the hydraulic ejection cylinder 72. The guides 76 may be U-shaped in cross section with the open portion facing the ejection cylinder 72.

Turning now to FIG. 2, the ejection cylinder 72 and its supports are more clearly illustrated. The ejection cylinder 72 includes a mid-cylinder support comprising a pair of laterally and generally horizontally extending arms 78. Each arm 78 carries a shoe 80 at the distal end thereof which is adapted to slide longitudinally within the corresponding guide 76.

An intermediate section 82 of the ejection cylinder 72 is also provided with a pair of laterally extending generally horizontal arms 84. Each arm 84 is provided with a shoe 86 that is slidably received in and guided by a corresponding one of the guides 76.

As the ejection cylinder 72 is extended the shoes 80, 86 pass from the guides 76 to corresponding longitudinal guides disposed internally with respect to the container. Thus the arms 78, 84 provide spaced apart vertical supports for the hydraulic ejection cylinder 72 (see the phantom lines in FIG. 2).

In order to releasably secure the container 26 (see FIG. 1) to the carriage assembly 24, rotatable latching members 88, 89 and positioning members 91, 93 are provided on the carriage assembly 24 in position to underlie a corresponding corner of the container 26 (FIG. 2). Each of the rotatable latch members 88, 89 projects vertically above the frame 60 (FIG. 1) and is rotatably mounted thereon.

Turning now to FIG. 3, the rotatable latch members 88, 89 are actuated as a pair. Accordingly, each latch member 88, 89 is securely connected to a corresponding lever arm 90, 92. A tie rod 94 interconnects the lever arms 90, 92 to insure essentially simultaneous rotation of the pair of rotatable latch members 88, 89. The lever arm 90 is provided with a laterally extending portion 96 which is pivotally connected to a hydraulic corner lock cylinder 98.

The corner lock cylinder 98 is suitably connected to a cross member 100 of the frame 60 such that extension of the hydraulic cylinder 98 causes rotation of the lever 90 and the shaft of the latch member 88. Movement of the lever 90 simultaneously causes a corresponding rotation of the lever 92 and the other latch 89 by virtue of the linkage effected by the tie rod 94. The second pair of latch members 91, 93 at the other end of the carriage assembly 24 is similar in all material respects to the pair of latch members just described. However, the second pair 91, 93 of latch members are not mounted for locking movement and primarily provide a positioning function.

Returning to FIG. 2, a container tailgate latching and unlatching assembly 102 is disposed at the end of the carriage assembly 24 adjacent to the container tailgate opening apparatus 40. The assembly 102 is illustrated in greater detail in FIG. 4 and includes a pair of pivotally mounted arms 104, 106. Each arm 104, 106 is connected to a corresponding longitudinal extension 108, 110 securely connected to a cross member 112 of the frame 60.

Each arm 104, 106 is pivotally connected to a corresponding hydraulic cylinder 114, 116 intermediate the ends of the arm 104, 106. The hydraulic cylinders 114, 116 provide an actuating force for swinging the corresponding arm 104, 106 through a horizontal arc about its corresponding support 108, 110.

The hydraulic cylinder 114 latches the container tailgate and is pivotally connected to another cross member 118 of the frame 60; the hydraulic cylinder 116 unlatches the container tailgate and is pivotally connected to a longitudinally extending frame member 120 that interconnects the frame cross members 112, 118. The arm 104 and its associated cylinder 114 comprise a container latching apparatus; whereas, the arm 106 and associated hydraulic cylinder 116 comprise a container unlatching apparatus.

The end of each arm 104, 106 is adapted to cooperate with a downwardly projecting lug 122 carried by the bottom of the container 26. After actuation, each hydraulic cylinder 114, 116 positions the corresponding arm 104, 106 in a position spaced from the lug 122. In this manner, clearance between the arms 104, 106 and the lug 122 is provided which avoids binding when the container is removed from the carriage. Turning now to FIG. 5, the bottom of the container 26 is illustrated along with the latching mechanism which holds the container tailgate assembly 124 tightly against the body of the refuse container 26.

The lower edge of the container tailgate assembly 124 includes a plurality of laterally spaced apart hook members 126 which are symmetrically disposed with respect to a longitudinally extending container centerline 128. The four hook members 126 cooperate with a corresponding plurality of lugs 130. The lugs 130 are symmetrically positioned on the container 26 and slidably disposed laterally of the centerline 28. Cooperating portions of each lug 130 moves into overlapping engagement with respect to cooperating portions of the corresponding hook 126.

The lugs 130 are actuated in pairs by linkage assemblies. Each linkage assembly comprises a tie bar 132 connected to each lug 130 and a transversely extending link rod 134. The link rods 134 are actuated by adjustable tie rods 136 of an over-center linkage. Each tie rod 136 is pivotally connected to an end member 138 of an actuating rod 140 and to a corresponding one of the link rods 134. The actuating rod 140 is disposed longitudinally with respect to the container 26 along the center line 128. The actuator rod 134 includes the downwardly extending projection 122 described above in connection with FIG. 4.

The actuating rod 140 is longitudinally slidable with respect to the container 26 and is illustrated in (FIG. 5) a locked position in which the tie rods 136 are disposed at an acute angle with respect to the actuating rod 140. When the actuating rod 140 moves to the unlatching position illustrated in phantom lines (FIG. 5) by movement of the arm 106 (FIG. 4), the tie rods 136 assume an obtuse angle with respect to the actuating rod 140 and retract the lugs 130 from the hooks 126. The over-center action of the rod 140 and tie rods 136 provides a mechanical lock which holds the lugs 130 and the hooks 126 in engagement with one another.

Figure 6:
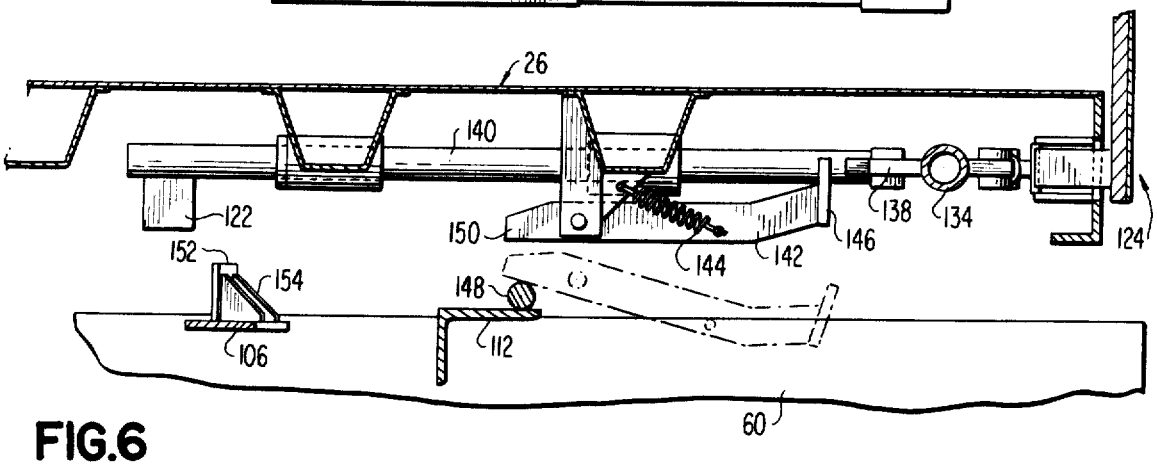
FIG. 6 is a cross sectional view taken along the line 6—6 of FIG. 5 with the refuse container in position above the carriage assembly of the unloading apparatus.

Turning now to FIG. 6, the actuating rod 140 is provided with a pivotally mounted yoke member 142 which is biased upwardly into contact with the actuator rod 140 by a spring 144. The yoke 142 carries a stop end 146 which interferes with a motion of the end member 138 and the actuator rod 140 so that the actuator rod 140 cannot be accidentally moved to the unlatched position.

The cross member 112 of the frame assembly 60 is provided with a vertically upstanding protrusion 148. The protrusion 148 is adapted to engage a lever end 150 of the yoke member 142 and overcome the spring bias when the container 26 is lowered into position on the frame assembly 60 (see the phantom lines in FIG. 6). Accordingly, with the yoke 142 released the actuator arm 140 is in position for longitudinal movement to its unlocking position.

The distal end of the unlatching arm 106 is provided with a vertically upstanding projection or plate 153 that is suitably braced by the gusset plates 155 (see FIG. 4). In this connection, the distal end of the arm 104 is also provided with a vertically upstanding plate 152 and bracing gussets 154.

Returning now to FIG. 6, movement of the arm 106 causes the plate 152 to engage the projection 122 and move the actuating rod 140 along the axis thereof thereby releasing the tailgate assembly 124 from the container.

Returning now to FIG. 1, the container 26 is provided with a longitudinally slidable transversely extending bulkhead assembly 160. The bulkhead 160 (see FIG. 7) is mounted for longitudinal movement with respect to the side walls 162 of the container 24 by generally U-shaped channels 164. The channels 164 are spaced above the container floor 166.

The bulkhead assembly 160 includes a vertically movable transversely extending resistance or braking assembly 168. The braking assembly 168 includes a friction pad 170 disposed on each end thereof and positioned within the generally U-shaped channel 164. The friction pads 170 each engage the upper horizontal surface of the corresponding channel 164 to provide friction contact therebetween.

Vertical movement of the braking assembly 168 (FIG. 8) is guided by a plurality of vertically upstanding projections 172 carried by a frame portion 174 of the bulkhead assembly 160. The braking assembly 168 is biased into frictional engagement with the channels 164 by a pair of lever cams 176, one of which is disposed at each side of the bulkhead assembly 160. The lever cams 176 are pivotally connected to tie rods 178 carried by actuator rods 180 extending from the spring housing 182.

The spring housing 182 encloses a compression spring 184 which generates a force transmitted through the rods 180, 178 to the lever cams 176. Each end portion of the spring housing 182 is provided with a plurality of adjusting bolts 186 which may be adjusted to control the normal face exerted by the lever cam 166 on the braking assembly 168 and, therefore, the friction force between the friction pads 170 and the corresponding guides 164.

To release the frictional engagement between the braking assembly 168 and the container guides 164, a releasing mechanism is provided which includes a pair of tie rods 188 that engage the lever cams 176. The tie rods 188 are pivotally connected to a generally vertical actuating rod 190 slidably mounted in the braking assembly 168. The actuating rod 190 (see FIG. 8) is pivotally connected to one arm of a bellcrank 192 that is carried by the frame portion 174 of the bulkhead assembly 160. A generally vertically extending portion 194 of the bellcrank 192 is positioned adjacent to a transversely extending protrusion 196 of the bulkhead assembly 160.

Returning now to FIG. 1 the ejection cylinder 72 is provided at the distal end thereof with a socket member 200 having a generally U-shaped recess between a pair of longitudinally extending fingers 202. When the ejection cylinder 72 is extended relative to the carriage assembly 24 it moves into engagement with the slidable bulkhead 160 of the container 26.

Turning now to FIG. 9, the lowermost finger 202 of the socket member 200 engages the generally vertical portion 194 of the bellcrank 192 and rotates it about a pivot 193. Accordingly, the rod 190 is lifted and the tie rods 188 overcome the bias of the spring 184 and allow the friction pads 170 to move away from the corresponding guides 164. Continued advancement of the ejection cylinder 72 causes the U-shaped opening in the socket portion 200 to bottom out and bear against the transversely extending protrusion 196 of the bulkhead 160.

Further extension of the ejection cylinder 72 into the container 26, causes the bulkhead assembly 160 to advance from the open end of the refuse container 26 towards the tailgate assembly 148. Plates 203, 205 on the frame 174 cause refuse in the container to be pushed toward discharge from the tailgate end of the container when the bulkhead assembly advances.

Upon reaching the limit of its stroke at the discharge end of the container 26, the ejection cylinder 72 is retracted. As the cylinder 72 retracts pressure between finger 202 and bellcrank 192 is released so that the friction pads are automatically engaged and the bulkhead assembly 160 remains at the discharge and of the container 26.

Figure 10:
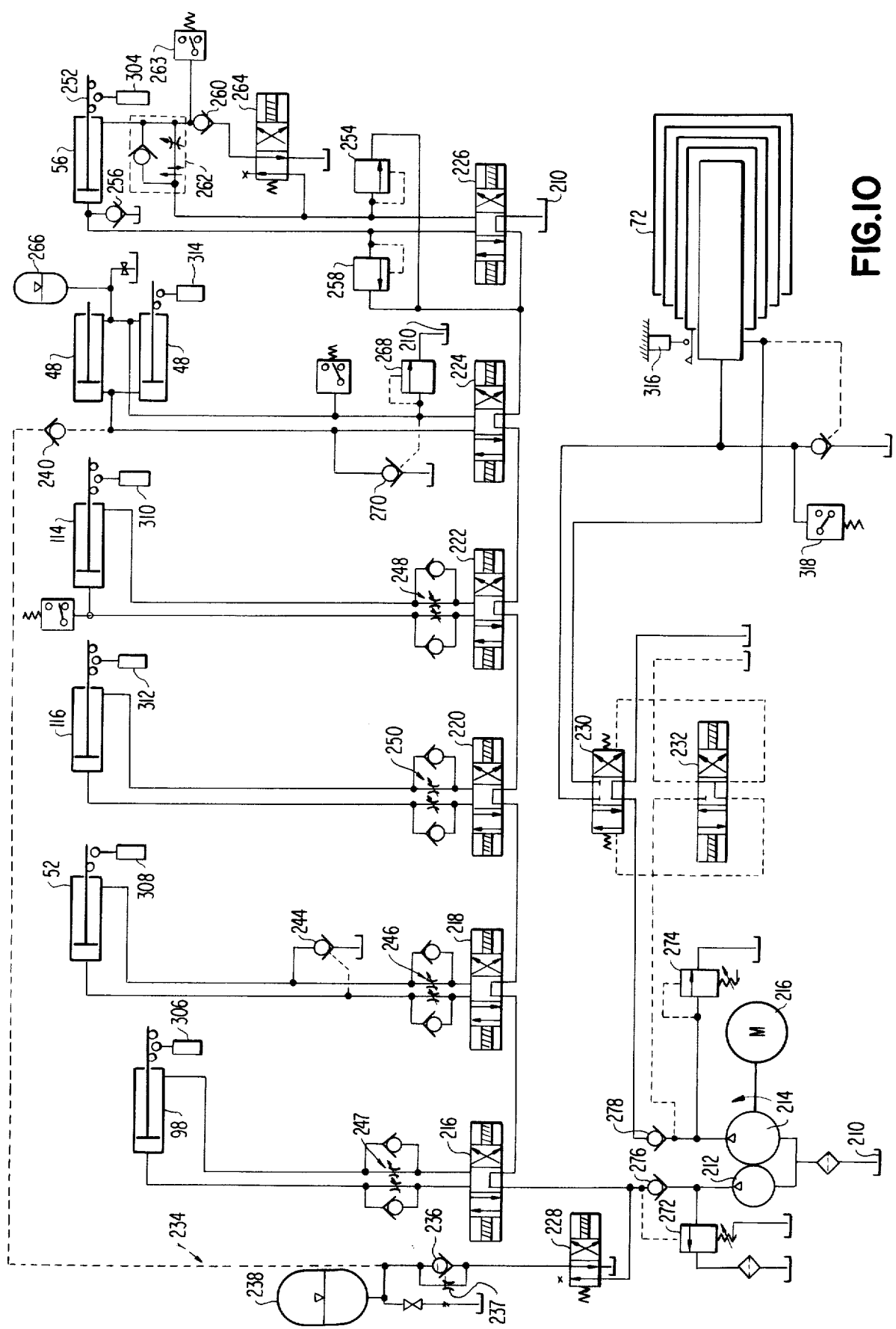
FIG. 10 is a schematic view of a hydraulic circuit for the unloading apparatus.

Turning now to FIG. 10, the hydraulic circuit includes a reservoir 210 which supplies hydraulic fluid to a pair of pumps 212, 214 which are driven by a suitable electric motor 216. The first pump 212 has a relatively low volumetric flow capacity (e.g., 7½ gal./min.) and supplies hydraulic fluid to a plurality of suitable conventional solenoid control valves. The first solenoid valve 216 controls the movement of the corner lock cylinders 98. The second solenoid valve 218 controls the flow of hydraulic fluid to and from the door engaging hydraulic cylinder 52. The third solenoid valve 220 controls the supply of hydraulic fluid to a hydraulic circuit servicing the door unlatching cylinder 116. The fourth solenoid valve 222 controls the flow of hydraulic fluid to a hydraulic circuit controlling the door latch cylinder 114. The fifth solenoid valve 224 controls the flow of fluid to a hydraulic circuit which operates the door opening cylinders 48 of the door opening assembly 40. The sixth solenoid valve 226 controls the flow of hydraulic fluid to the carriage positioning cylinder 56. And, a seventh solenoid valve 228 controls the flow of hydraulic fluid to a pressure holding circuit.

The second pump 214 has a relatively large capacity (e.g., 21 gal./min.) and supplies fluid to the ejector cylinder 72 through pressure actuated control valve 230 that is operated by a solenoid actuated pilot valve 232. The solenoid pilot valve 232 is controlled so that the ejection cylinder 72 advances through a plurality of equal length intervals that are interrupted by a constant time delay. In this manner, variation of the time delay can correspondingly vary the total time required to extend the cylinder 72.

A pressure accumulating system 234 is provided to keep the door raising cylinders 48 constantly pressurized when the container tailgate is engaged and raised. The accumulating system is pressurized by actuating solenoid valve 228 to admit fluid through a check valve 236, that bypasses a conventional restriction 237, to a suitable conventional hydraulic accumulator 238. The restriction 237 avoids sudden release of pressure in the accumulator 238 when the solenoid valve 228 is deenergized. The accumulator 238 stores pressure and admits it to the cylinder side of the door raising cylinders 48 through a suitable conventional check valve 240. The check valve 240 does not allow the accumulator 238 to be pressurized when the associated cylinders are actuated.

The rod side of the cylinder 52 may be provided with a pilot operated check valve 244 that guards against inadvertent release of the hook. If desired a flow controlling supply 246 may be interposed between the control valve 218 and the cylinder 52. The corner lock cylinder 98, the latching cylinder 114 and the unlatching cylinder 116 may, if desired, be provided with a flow controlling supply 247, 248, 250 respectively. The flow controlling supplies 246, 247, 248, 250, are operable to regulate the operating speed of the associated cylinder.

The position cylinder 56 includes a hydraulic cushioning system to reduce impulsive loads during a powered stroke of the cylinder. When the solenoid control valve 226 shifts to a neutral position, momentum of the container and the carriage assembly will cause the rod 252 of the cylinder to continue its movement thereby generating hydraulic pressure in the side of the cylinder 56 toward which the piston had been moving.

During extensional movement of the cylinder, for example, pressure is generated in the rod side of the cylinder 56. A pilot operated pressure relief valve 254 is provided in communication with the rod side of the cylinder to relieve pressure above a specified level by venting excess pressure back to the reservoir 210. Simultaneously, with the continued extensional movement, a check valve 256 on the cylinder side opens to allow unpressurized hydraulic fluid to enter the cylinder side of the piston and replace the fluid exhausted from the rod side. A similar pilot operated pressure relief valve 258 and check valve 260 are provided to permit similar cushioning action at the end of a retracting stroke of the positioning cylinder 56.

Retraction of the positioning cylinder 56 is effected at a variable rate. During the initial portion of a retraction stroke, the control valve 226 as well as a solenoid speed control valve 264 are energized. The carriage and container thus move at full speed toward the unloading position. At a predetermined position spaced from the unloading position is a suitable conventional limit switch which is tripped by the carriage. The limit switch, when tripped, deenergizes the speed control valve 264 and causes pressurized fluid from the control valve 226 to pass through a suitable conventional pressure and temperature compensated variable venturi valve 262.

The variable venturi 262 provides a reduced flow of hydraulic fluid at the end of the retraction stroke so that the carriage moves gently against the stops at the unloading position. The cushioning system of the relief valve 258 and the check valve 260 cooperate to allow deceleration of the carriage from the full speed portion of the retracting stroke to the slow speed portion governed by the variable venturi valve 262.

As the carriage moves against the stops at the unloading position, hydraulic pressure increases so that a suitable conventional pressure switch 263 communicating with the rod side of the positioning cylinder 56 causes the control valve 226 to shift back to the neutral position.

The tailgate lifting cylinders 48 are provided with a pressure accumulator 266 on the rod side to assure that the lift cylinders are fully retracted when the carriage is moved away from the unloading position. The accumulator 266 also allows the swingable frame portion 44 (FIG. 1) to be displaced when a container 26 is advanced by means of the carriage 24 through the opening of the rigid frame 42. As a further safeguard, the rod side of the cylinders 48 communicate with a pilot operated pressure relief valve 268. The cylinder side of each lifting cylinder 48 communicates with a check valve 270 which is pilot operated by rod side pressure to admit makeup fluid to the rod side if the container pushes against the opening assembly with too great a force.

Each pump 212, 214 has a corresponding relief valve 272, 274 to prevent over pressurization of the hydraulic system. Moreover, each pump 212, 214 supplies fluid to the system through a corresponding check valve 276, 278 that prevents loss of system pressure in case of a pump failure. The pump 214 supplying fluid to the ejection cylinder 72 has a constant volumetric flow rate.

The check valve 276 and the relief valve 272 preferably comprise a conventional unloading relief valve which keep the system pressurized at 85 to 100% of system pressure. The relief valve 272 opens when nominal system pressure exists downstream of check valve 276 and stays open until the system pressure drops to about 85% of its nominal value. At the lower pressure level, the relief valve closes until nominal system pressure is again attained. In this manner, the work required from the pump 212 is reduced.

As noted, the desired stroke of the ejection cylinder 72 is divided into a multiplicity of uniform length increments. With a telescoping hydraulic cylinder such as the ejection cylinder 72, the time required to extend the cylinder through one length increment depends upon which stage of the cylinder 72 is undergoing extension. Thus, with the small end of the ejection cylinder 72 fixed to the carriage assembly the time required to extend the cylinder through one length increment decreases when the smaller diameter stages become active.

During a stroke, the cylinder is advanced one length increment, stopped for a time interval, advanced another length increment, stopped for another time interval, etc. The desired time for one stroke of the ejection cylinder 72 may be varied by varying a constant time delay that is interposed between each of the successive cylinder advancements. Where the time delay is large compared to the time required for advancing one length increment, the resulting elongation of the ejection cylinder 72 thus becomes essentially constant with respect to time.

Figure 11:
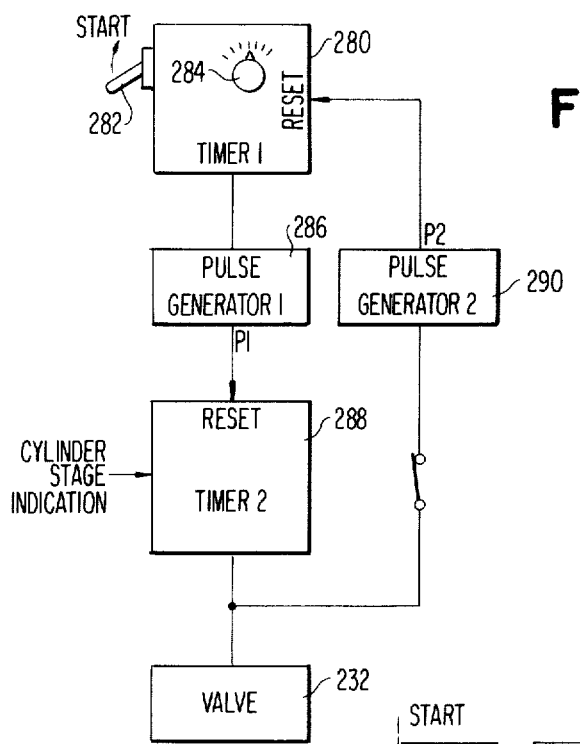
FIG. 11 is a schematic illustration of a control circuit for the ejection cylinder of the unloading apparatus.

Turning now to FIG. 11, a suitable conventional timer 280 having a starting switch 282, a continuously variable time delay adjustment 284 and a reset terminal comprises one element of a first timer assembly for use in controlling the solenoid valve 232. The first timer assembly also includes a suitable conventional pulse generator 286 which generates a pulse P1 when the timer 280 reaches the end of a time delay interval set by the adjustment 284. The pulse P1 is communicated to a second timer assembly comprising a suitable conventional timer 288 and a suitable conventional pulse generator 290 that generates a start pulse P2. The timers 280, 288 may be suitable conventional RC timing networks.

The timer 288 receives an input from a cylinder stage identifier to correspondingly vary the time delay of timer 288. The timer 288 is directly connected to the pilot solenoid valve 232 such that the valve 232 is open when the timer 288 is counting time.

Figure 12:
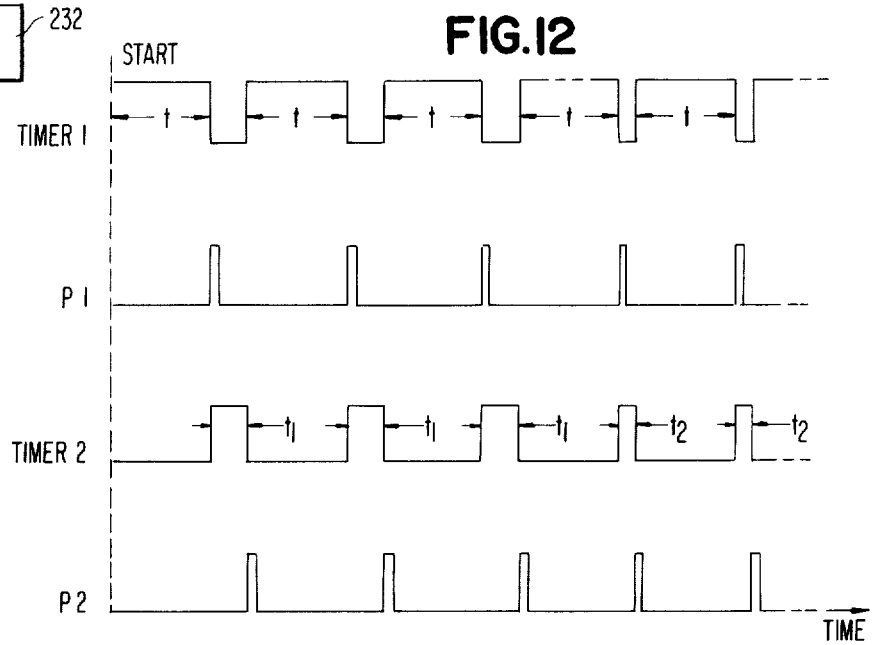
FIG. 12 is a timing diagram for the control circuit of FIG. 11.

To understand the operation of the cylinder control system of FIG. 11, the diagram of FIG. 12 is helpful. More particularly, when the start switch is initiated the first timer 280 is triggered and counts for a time $t$. At the end of the time $t$ the pulse generator 286 generates a pulse P1 which resets and triggers the timer 288. The timer 288 opens the valve 232 throughout a time $t1$. At the end of the time $t1$, the pulse generator 290 generates a start pulse P2 which resets and triggers the first timer 280 which then begins to cycle anew.

After one stage of the cylinder 72 is fully extended, the timer 288 is adjusted so that its time interval is a new and shorter time $t2$. The foregoing adjustment also occurs for each successive stage of the ejection cylinder 72.

Figure 13:
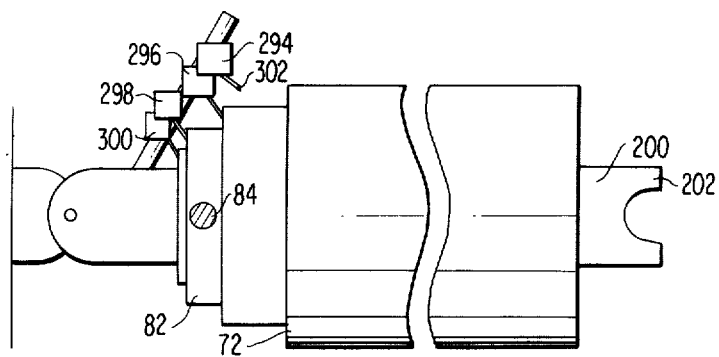
FIG. 13 is a detail view of the hydraulic ejection cylinder illustrating a stage indicator.

To change the time delay of the second timer 288, limit switches 294, 296, 298, 300 (FIG. 13) are provided on the cylinder 72. As successively higher stages of the telescoping cylinder 72 are reached, contact with a finger 302 of the limit switch is released. With release of contact, the corresponding limit switch changes the timer setting to a value appropriate for the subsequent stage. In the foregoing manner, simple variation of the off period may be employed in order to vary the overall time required to cycle the cylinder 72 through one stroke. While limit switches may be used, it should be apparent that cams and load cell sensor may also be used to switch the time delay of the second timer 288.

In operation (see FIG. 1) a container 26 is positioned on the carriage assembly 24 in the container receiving position. The refuse container 26 is then latched with respect to the carriage assembly 24 by operation of the locking cylinders 98 and corresponding rotation of the rotatable T-shaped latched members 88.

The latching cylinder 98, the hook cylinder 52, the container tailgate latch operating cylinders 114, 116, the tailgate lifting cylinders 48, and the ejection cylinder 72 may each be provided with a corresponding limit switch 306, 308, 310, 312, 314, 316 to indicate the position of the respective cylinder. The limit switch 316 may be tripped by a follower carried by the last stage of the ejection cylinder 72, as illustrated. The position indication may occur in the form of signal lights on a control panel.

The carriage assembly 24 is then advanced to the container unloading position by actuation of the positioning cylinder 56. Before the unloading position is reached, the speed control valve 264 shifts to its neutral position and momentum carries the container against the hydraulic damping of the positioning cylinder. The low speed portion of the retraction stroke, controlled by the variable venturi valve 262, completes any further retraction of the hydraulic cylinder which is necessary to finally position the carriage at the unloading position. In the unloading position, the hinge line 47 of the tailgate assembly is positioned beyond the hinge line 45 of the opening assembly 40 (FIG. 1) so that hinge line 45 is intermediate the ends of the container.

The hook cylinder 52 is then actuated causing the hook 50 to move vertically upwardly and into engagement with the bail provided in the container tailgate end portion. Subsequently, the unlatching assembly comprising the hydraulic cylinder 116 and the arm 106 (see FIG. 4) is actuated to engage the downward projection 122 of the tailgate latch actuator rod 140. The rod 140 moves longitudinally away from the tailgate assembly thereby unlatching the tailgate assembly 124 and freeing it for pivotal motion about a horizontal axis at the top of the container.

Next, the door lifting cylinders 48 are actuated to lift the swingable portion 48 of the tailgate opening assembly 40 with respect to the rigid portion. Cooperation between the hook 50 and the bail of the container tailgate causes the container tailgate to be lifted vertically upwardly about the horizontal axis and into an open position. The position of the door opening assembly hinge line 45 with respect to the tailgate assembly hinge line 47 is an over center system that causes the hook 50 to be mechanically engaged with the tailgate assembly 124 and thus accommodates misalignment of the container tailgate hinge 47 and the horizontal axis 45 of the swingable portion 44.

With the container thus ready for discharge of refuse, the solenoid control valve 226 is energized to its cylinder retracting position to maintain the carriage at the unloading position. At the same time, solenoid valve 228 is energized to pressurize the accumulator system so that the container door assembly will be held open. Subsequently, the time for complete emptying of the cylinder may be appropriately adjusted by setting the timer adjustment knob 284. The hydraulic ejection cylinder 72 is then activated. As the hydraulic cylinder 72 moves into engagement with the transverse bulkhead assembly 160 it releases the friction pad assembly 170 and frees the bulkhead assembly 160 for longitudinal movement throughout the container. Continued movement of the ejection cylinder pushes the bulkhead assembly 160 toward the tailgate end of the container 26 and evacuates the contents thereof at a controlled rate onto the conveyor 28 for further processing.

As the ejection cylinder 72 advances from the carriage assembly 24 toward the container 26 it is guided by the cooperation of the transversely extending arms 78, 84 and their associated shoes 80, 86. The shoes 80, 86 first contact the guides 76 on the carriage assembly 24 and then contact the longitudinally extending guide channels 164 on the internal side walls of the container 26.

When the ejection cylinder 72 reaches the end of its stroke, it trips the limit switch 316. Due to the mechanical limit of bulkhead assembly movement, the system pressure increases to trip a pressure switch 318. The limit switch 316 and the pressure switch 318 cause cylinder retraction to begin and interlock to assure that the cylinder 72 reaches the end of its stroke before retracting. For example, if the bulkhead assembly became stalled without the container being empty, the interlocked switches would not cause retraction since the limit switch 316 had not yet been tripped.

Next, the solenoid valves 226, 228 are deenergized to bleed the accumulator 238 in preparation for moving the carriage back to the container loading position. The container tailgate assembly is closed by lowering the lift cylinders 48 and is then latched by actuation of the latch cylinder 114 through the solenoid valve 222. With the tailgate assembly closed and latched, the carriage is moved by the positioning cylinder 56 and the locks are opened with appropriate actuation of the lock cylinder 98.

While the unloading apparatus described above includes a slideable carriage 24, it will be apparent that an unloading station need not include a carriage where the container is not moved into a building for discharge of its contents. In a modified apparatus without such a carriage, a container may be vertically lowered into position, opened and emptied without reciprocatory movement of the container.

A refuse container unloading system constructed in accordance with the present invention avoids the need for workmen other than a single man to operate the necessary solenoid valves. Thus, a great saving in manual labor is effected by the present container unloading system.

It should now be apparent that the refuse container unloading station described above substantially accomplishes the objects of this invention. In addition, it will be apparent to those skilled in the art that there are numerous variations, substitutions, modifications and equivalents of the features of this invention which do not depart from the spirit of this invention. Accordingly, it is expressly intended that all such modifications, variations, substitutions, and equivalents which fall within the spirit and scope of the invention as defined in the appended claims be embraced thereby.

What is claimed is:

1. A refuse container unloading apparatus for discharging material from a transportable refuse container, comprising:
   carriage means for supporting a removable container during unloading thereof, the carriage means being movable longitudinally thereof between a container receiving position and a container refuse unloading position;
   positioning means connected to the carriage means for moving the carriage means between said positions, the positioning means including a deceleration means for slowing inertial movement of the carriage means; and
   ejection means for discharging refuse from said container when the carriage is in the unloading position.

2. A refuse container unloading apparatus for discharging material from a transportable refuse container, comprising:
   carriage means for supporting a removable container during unloading thereof, the carriage means being movable longitudinally thereof between a container receiving position and a container refuse unloading position;
   positioning means connected to the carriage means for moving the carriage means between said positions;
   ejection means for discharging refuse from said container when the carriage is in the unloading position; and
   wherein the positioning means includes
      a double acting hydraulic cylinder having first and second actuating chambers, and control means for actuating the hydraulic cylinder, communicating with the first and second actuating chambers, the control means having a pressurizing position to admit pressurized fluid to the first actuating chamber and a neutral position, and
      a deceleration means for slowing inertial movement of the carriage means that includes
      pressure relief means communicating with the second actuating chamber for limiting the maximum hydraulic pressure in the second actuating chamber which pressure results from inertial movement of the carriage means when the control means shifts to the neutral position from the pressurizing position, and
      supply means communicating with the first actuating chamber, for admitting fluid to the first actuating chamber independently of the control means thereby allowing displacement of the cylinder means caused by inertial movement of the carriage means.

3. A refuse container unloading apparatus for discharging material from a transportable refuse container, comprising:
   carriage means for supporting a removable container during unloading thereof, the carriage means being movable longitudinally thereof between a container receiving position and a container refuse unloading position;
   positioning means connected to the carriage means for moving the carriage means between said positions;
   ejection means for discharging refuse from said container when the carriage is in the unloading position; and
   wherein the positioning means includes
      a double acting hydraulic cylinder having an extension chamber and a retraction chamber,
      a control valve means communicating with the extension chamber and the retraction chamber, having a neutral position, an extension chamber pressurizing position, and a retraction chamber pressurizing position, and
      a deceleration means for slowing inertial movement of the carriage means that includes
      first pressure relief valve means communicating with the extension chamber for limiting the maximum pressure therein,
      second pressure relief valve means communicating with the retraction chamber for limiting the maximum pressure therein,
      first check valve means communicating with the extension chamber and a reservoir for admitting fluid to the extension chamber from the reservoir,
      second check valve means communicating with the retraction chamber and a reservoir for admitting fluid to the retraction chamber from the reservoir, and
      the first relief valve means and the second check valve means cooperating to hydraulically cushion inertial movement of the carriage means during retracting motion and the second relief valve means and the first check valve means cooperating to hydraulically cushion inertial movement of the carriage means during extensional motion with the control valve means in the neutral position.

4. A refuse container unloading apparatus for discharging material from a transportable refuse container comprising:
   carriage means for supporting a removable container during unloading thereof, the carriage means being movable longitudinally thereof between a container receiving position and a container refuse unloading position;

positioning means connected to the carriage means for moving the carriage means between said positions;

ejection means for discharging refuse from said container when the carriage is in the unloading position; and wherein the positioning means includes a double acting hydraulic cylinder having first and second actuating chambers, control means communicating with the first and second actuating chambers, for dividing a stroke of the cylinder into high speed and low speed portions, the control means having a high speed position and a low speed position, and deceleration means for slowing inertial movement of the carriage means from the high speed to the low speed when the control means shifts from the high speed position to the low speed position.

5. The container unloading apparatus of claim 4, wherein the control means includes:

a flow restriction communicating with the first actuating chamber;

a control valve having a neutral position and a pressurizing position that communicates with the flow restriction; and a speed control valve communicating with the first actuating chamber and the pressurizing position of the control valve, and including the high speed position that is a bypass position which circumvents the flow restriction to cause actuation of the cylinder at a high speed, and the low speed position that is an interrupting position in which the flow restriction is operative to cause actuation of the cylinder at a low speed.

6. Apparatus for unloading a container comprising:

a refuse container having a slidably mounted head therein with releasable resistance means between the head and the refuse container for resisting movement of the head relative to the refuse container regardless of head position, when the resistance means is engaged;

means for supporting the container, underlying the refuse container in supporting relation and having ejection means connected to the support means;

means for preventing movement of the refuse container during ejection of refuse material from the container; and means for releasing the resistance means of the container to allow movement of the head relative to the container by the ejection means, the means for releasing being operated by engagement of the ejection means.

7. The apparatus of claim 6 wherein the ejection means bears against the head to move the head toward a discharge opening of the container while simultaneously engaging the releasing means.

8. The combination of claim 7 wherein:

the ejection means includes an hydraulic cylinder having a socket in an end portion thereof;

the head includes a protrusion which is received by the socket in force transmitting relationship to move the head; and the releasing means includes a lever adjacent to the head protrusion which is contacted by the socket to release the resistance means.

9. An unloading station for transportable refuse containers, comprising:

a refuse container including a tailgate, a tailgate latch having a projection beneath the container, and a slidable bulkhead means for discharge of the refuse material from the container;

container support means for supporting the container and including an unloading platform;

container opening means for opening the container tailgate being mounted at an end of the platform; and carriage means for supporting the container for longitudinal movement on the platform to and from the container opening means, having two ends and including positioning means constraining the container from movement with respect to the carriage means, tailgate latch operating means at one end of the carriage means for actuating the tailgate latch, ejection means at the other end of the carriage means for pushing the slideable bulkhead to discharge contents from the container, and means connected to the carriage means and the platform for reciprocation of the carriage means.

10. The unloading station of claim 9 wherein:

the container opening means being disposed within a building at an access opening; and the means for reciprocation includes an hydraulic cylinder operable to move the carriage means partially into the building and to hydraulically cushion the carriage means at the end of the carriage movement.

* * * * *